United States Patent
Groelz et al.

(10) Patent No.: US 6,672,228 B1
(45) Date of Patent: Jan. 6, 2004

(54) CONTINUOUS SEED METERING SYSTEM

(76) Inventors: Ned C. Groelz, 308 W. Hwy. 34, Phillips, NE (US) 68865-2504; William D. Oswald, 1004 W. 12 Rd., Aurora, NE (US) 68818

( * ) Notice: Subject to any disclaimer, the term of this patent is extended or adjusted under 35 U.S.C. 154(b) by 0 days.

(21) Appl. No.: 10/436,907

(22) Filed: May 13, 2003

(51) Int. Cl.[7] .............................. A01C 7/00; A01C 9/00
(52) U.S. Cl. ....................................... 111/177
(58) Field of Search ............................... 111/34, 36, 37, 111/170, 174, 177–185, 77, 78, 200; 221/211

(56) References Cited

U.S. PATENT DOCUMENTS 5,598,794 A * 2/1997 Harms et al. ............... 111/177

* cited by examiner

Primary Examiner—Christopher J. Novosad
(74) Attorney, Agent, or Firm—Thomte, Mazour & Niebergall; Shane M. Niebergall

(57) ABSTRACT

A device for planting different varieties of seeds is provided with a seed hopper or carousel that is selectively placed in open communication with a plurality of seed metering devices. A selectively positionable gate member directs the seeds to specific seed metering devices. The seed metering devices are movable on the device to engage a first metering device with a ground engagement assembly and a second metering device with a discharge container. The seed metering devices operate in alternating seed-dispersing and clearing modes simultaneously to speed planting. A GPS system may be incorporated to track and accurately control the planting operation.

20 Claims, 8 Drawing Sheets

CONTINUOUS SEED METERING SYSTEM

BACKGROUND OF THE INVENTION

The present invention relates to agricultural machinery and, more particularly, to an improved seed metering system that is capable of continuously planting different seed varieties in a single field.

DESCRIPTION OF THE PRIOR ART

Seed metering systems have been used for some time to plant seeds at various controlled rates into seed furrows as the metering system is advanced along the field. Such metering systems are typically configured to be towed behind a tractor or other motorized vehicle. The system typically includes a unit for storing a certain quantity of seeds to be planted, some means for opening a furrow in the ground as the device is advanced across the field, one or more seed metering devices or singulators coupled to the seed storage unit for dispensing individual seeds into the furrow at a selected rate, and some means for closing the furrow over the seeds.

Such seed metering systems are frequently used in research fields for the testing of hybrid seeds and the like. However, in these conditions, the seed metering device must be able to plant seeds of different varieties within the same field. Accordingly, an individual must usually load the seed storage unit with one particular hybrid of seed, plant those seeds along a predetermined length of field, stop, and clear all of the singulating units to ensure that that particular hybrid of seed is fully discharged from the singulators. The individual then loads the next hybrid of seed within the seed storage unit and repeats the process throughout the planting operation. This "stop-and-go" method of planting typically results in a planting rate of no more than a quarter to a half mile an hour. At this rate, the planting of an entire research field, or any field requiring the use of different seeds, can consume a great deal of valuable time.

Individuals using the stop-and-go method of planting typically rely on a mileage indicator on the tractor, a rough estimate of planting time, or judging a line of sight to particular landmarks for estimating the distance or amount of seed planted. This use of estimation for determining the location for initiating and terminating the planting of a particular type of seed further slows the planting operation and creates gross inaccuracies throughout the field.

Accordingly, what is needed is a seed metering device that is capable of continuous and accurate planting of multiple seed varieties in a single field.

SUMMARY OF THE INVENTION

The device for planting seeds of the present invention is generally provided with a mobile frame and a seed container for carrying one or more varieties of seed. A plurality of seed metering devices are positioned in open communication with the seed container to receive and individually dispense the seeds. The plurality of seed metering devices are also in open communication with a ground engagement assembly that forms furrows in the ground, places the seeds within the furrows, and then closes the furrows over the seeds.

The seed metering devices are operatively coupled to one another so that, as one seed metering device is operating in a dispensing mode, the adjacent seed metering device is operating in a clearing mode. The seed metering devices are slidably movable with respect to the frame to permit the selective positioning of a seed metering device that is operating in a dispensing mode over the ground engagement assembly while the adjacent seed metering device is positioned over a seed discharge cup. The seed metering devices are preferably secured to a sled that is slidably coupled to the frame and automatically actuated with a power cylinder system.

The seed container in one embodiment of the present invention is a simple seed hopper. However, in a second embodiment, a seed carousel is provided having a plurality of seed cups that are movable along a selected pathway. The pathway of the carousel (or the opening of the hopper) is coupled to the opening of a gate member that is selectively movable to direct the seeds to one or more supply tubes that feed the seed metering devices.

A GPS assembly can be provided with the present invention to accurately determine the location of the device and track the distances traveled during a planting operation.

Accordingly, a principal object of the present invention is to provide a seed planting device that is capable of continuously planting different seed varieties in a single field.

A further object of the present invention is to provide a device for planting seeds having a plurality of seed metering devices that are alternately coupled to one another to operate in planting and clearing modes simultaneously.

Still another object of the present invention is to provide a device for planting seeds having a seed carousel capable of carrying several varieties of seed through a pathway that permits the selective dispersal of the different seed varieties.

Yet another object of the present invention is to provide a device for planting seeds that is controlled and tracked using a GPS assembly.

Still another object of the present invention is a device for planting seeds that is capable of planting several varieties of seeds in a single field in a quick and accurate manner.

A further object of the present invention is to provide a device for planting seeds that is remotely actuated.

Still another object of the present invention is to provide a device for planting a plurality of seed varieties within a single field that is simple in construction and operation.

These and other objects will be apparent to those skilled in the art.

DESCRIPTION OF THE PREFERRED EMBODIMENT

The seed metering system 10 of the present invention is generally depicted in FIGS. 1–8. The embodiment of the seed metering system 10 depicted in the figures is provided with a mobile frame 12 that may be towed behind a tractor or other motorized vehicle during a planting operation. However, it is contemplated that the seed metering system 10 of the present invention could be incorporated within a motorized agricultural seeding machine as a single unit.

Figure 1:
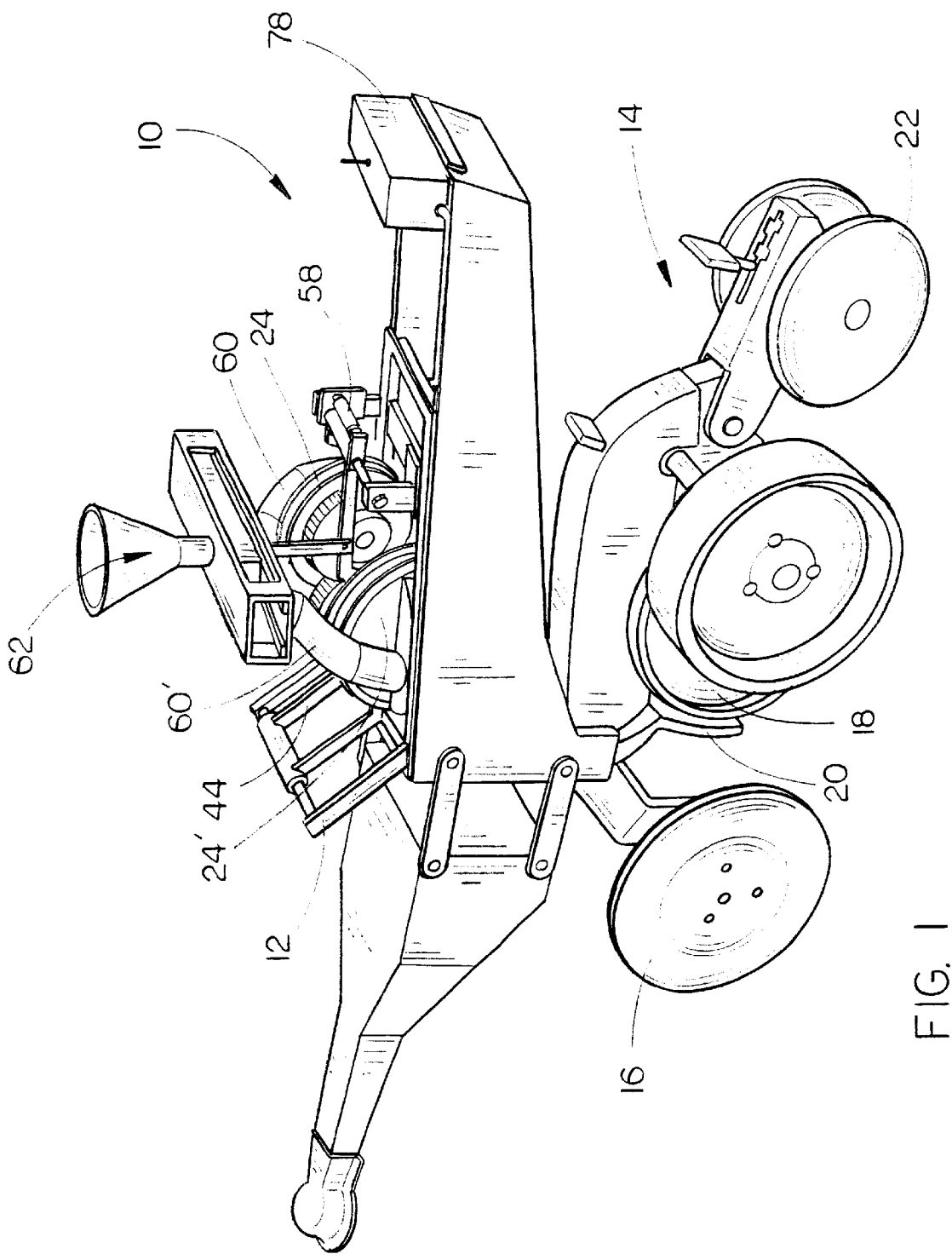
FIG. 1 is a perspective view of one embodiment of the seed metering system of the present invention.
Figure 2:
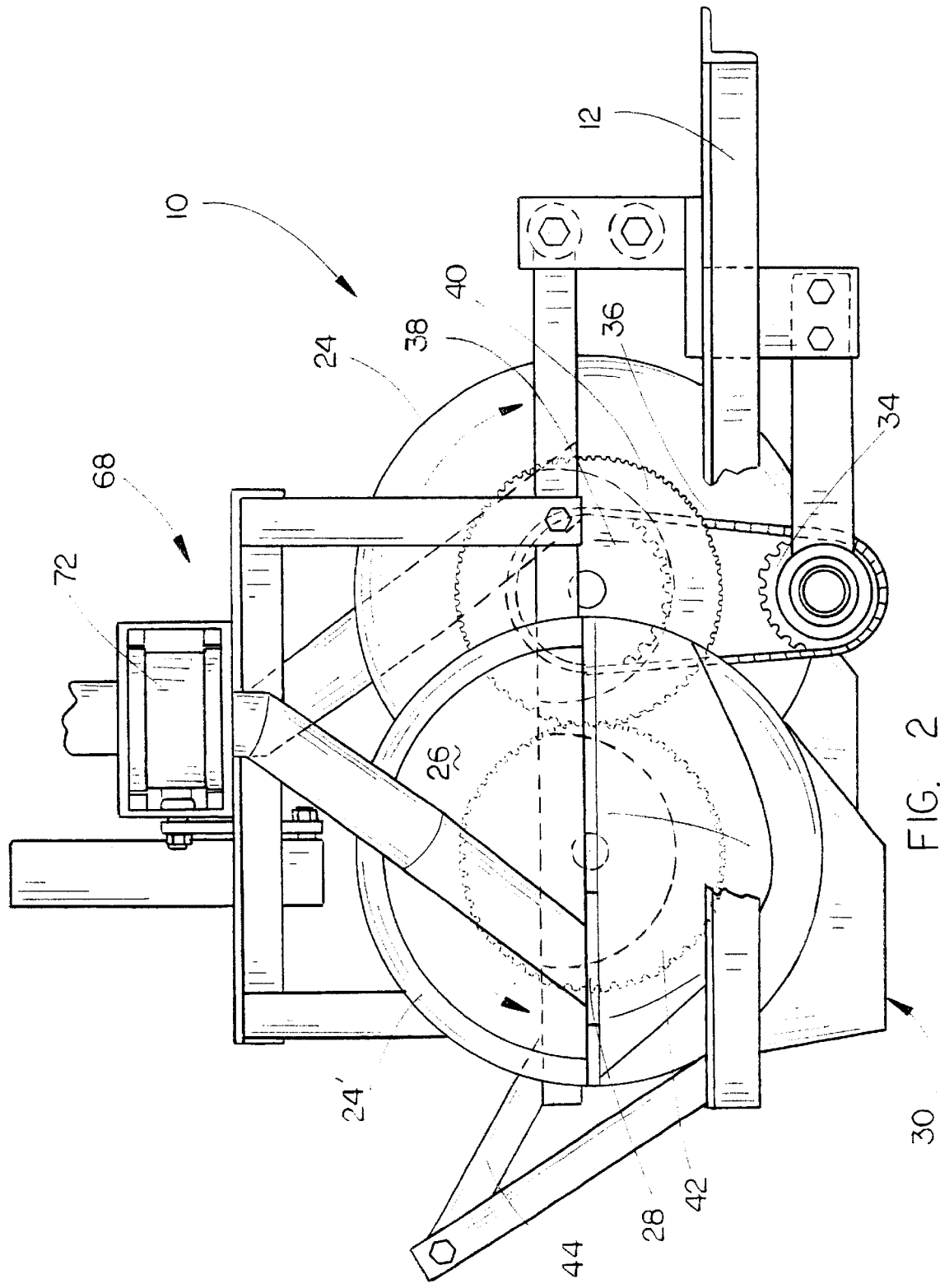
FIG. 2 is a partial side elevation view of an embodiment of the seed metering system of the present invention.
Figure 3:
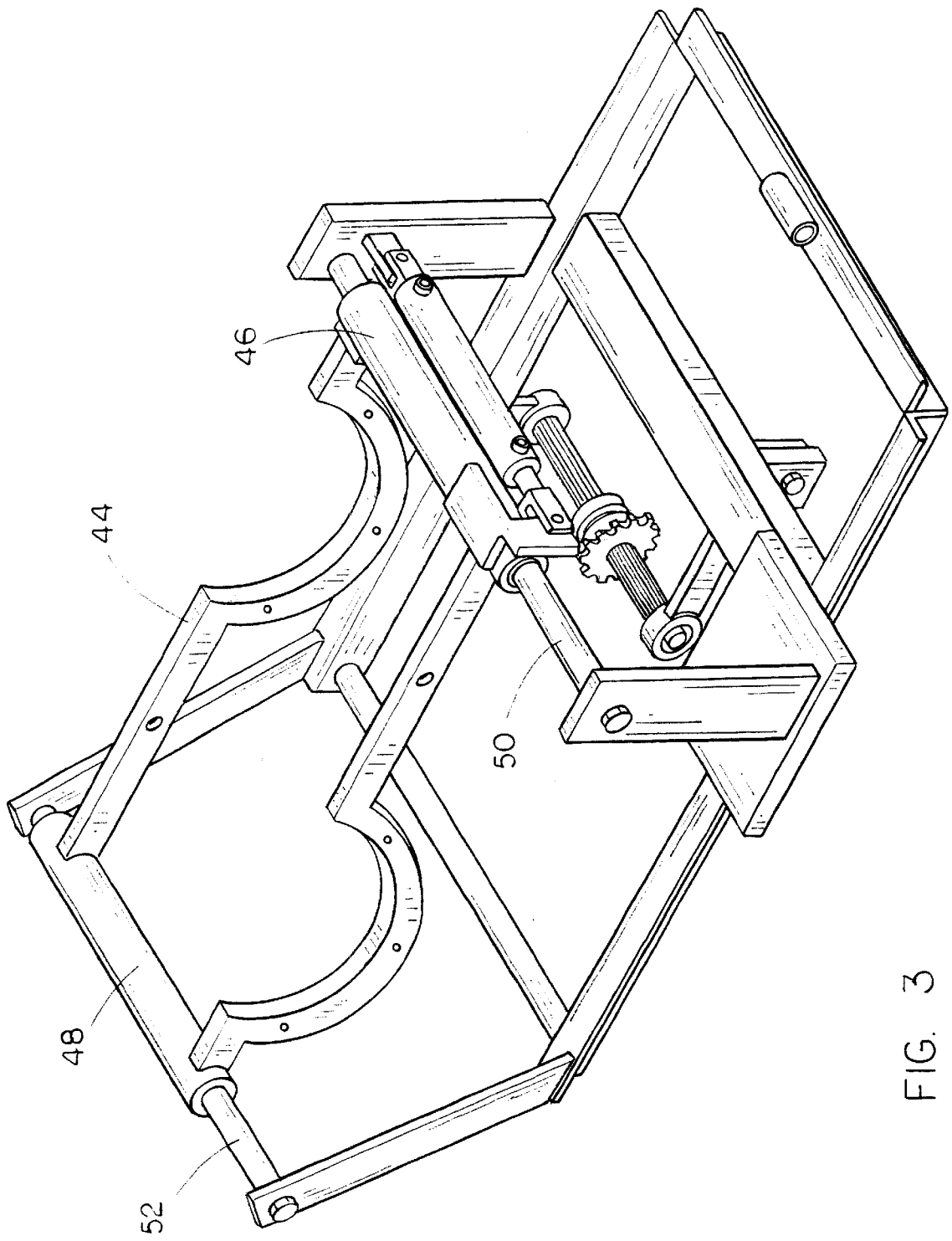
FIG. 3 is a perspective view of an embodiment of the frame and sled assembly of an embodiment of the seed metering system of the present invention.
Figure 4:
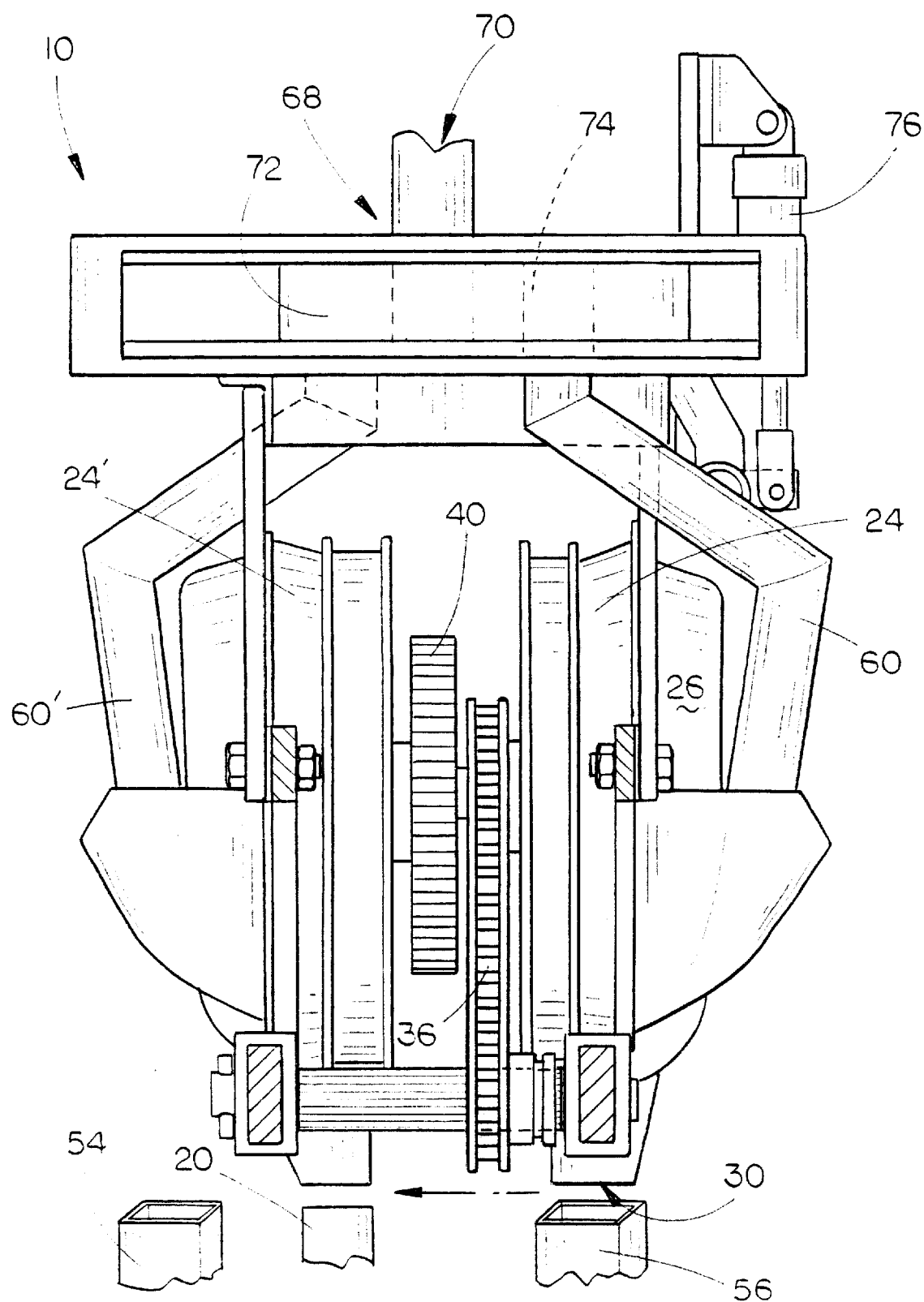
FIG. 4 is a partial front elevation view of an embodiment of the seed metering system of the present invention.
Figure 5:
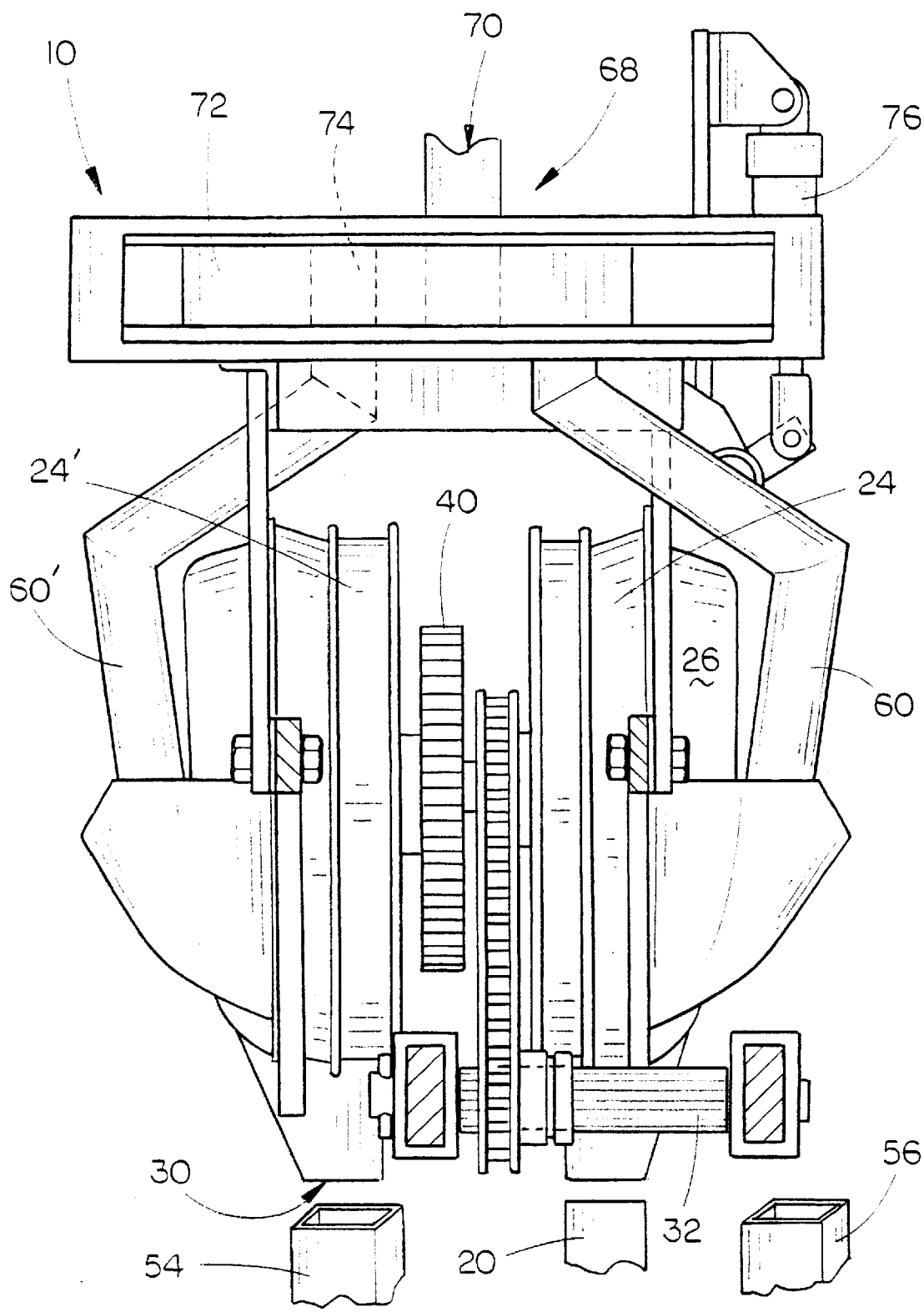
FIG. 5 is a partial front elevation view of the embodiment of the present invention depicted in FIG. 4 as the same may be selectively moved into alternating positions.
Figure 6:
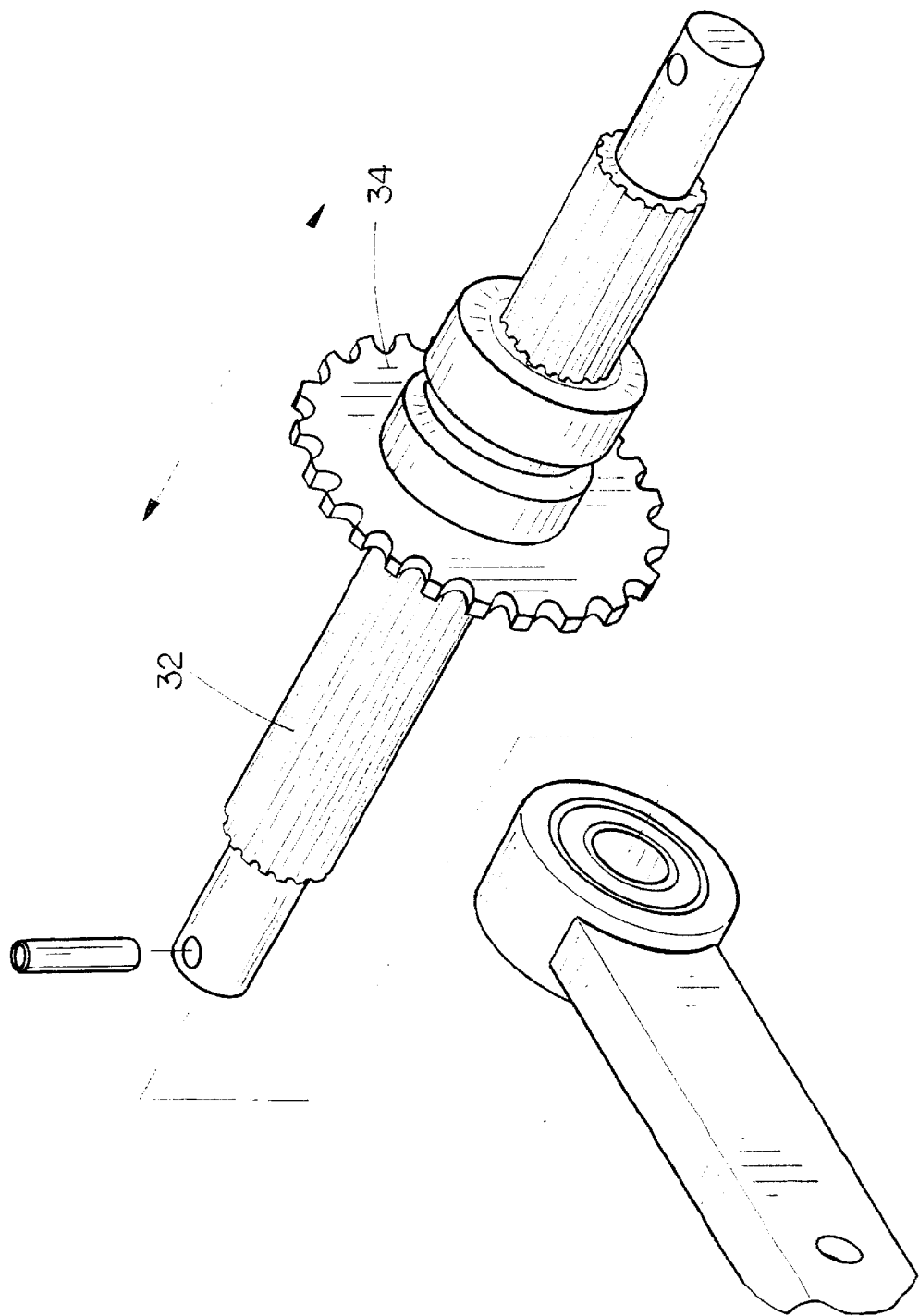
FIG. 6 is a partial exploded view of the spline shaft assembly of an embodiment of the seed metering system of the present invention.
Figure 7:
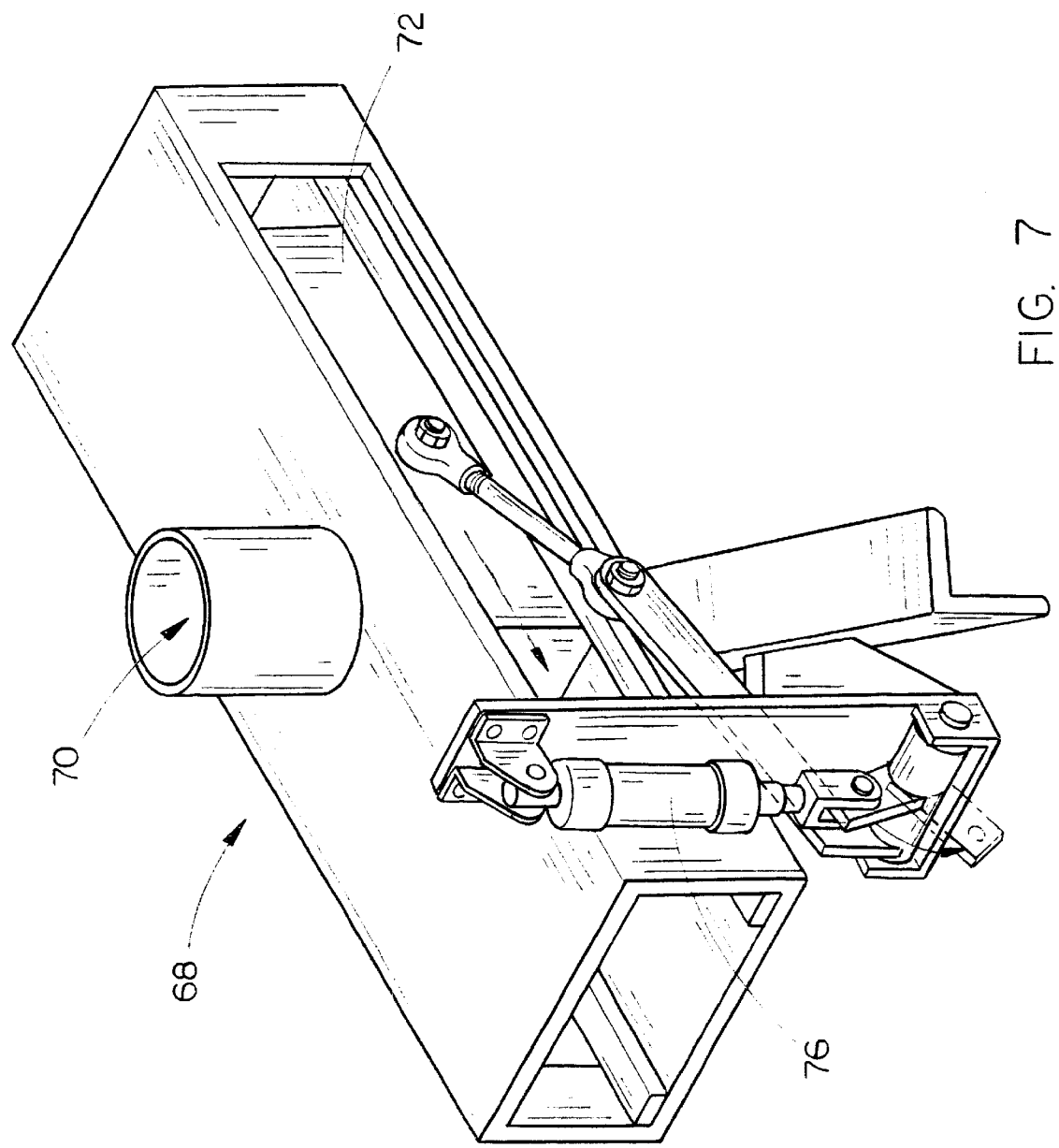
FIG. 7 is a partial perspective view of the gate assembly of the seed metering system of the present invention.
Figure 8:
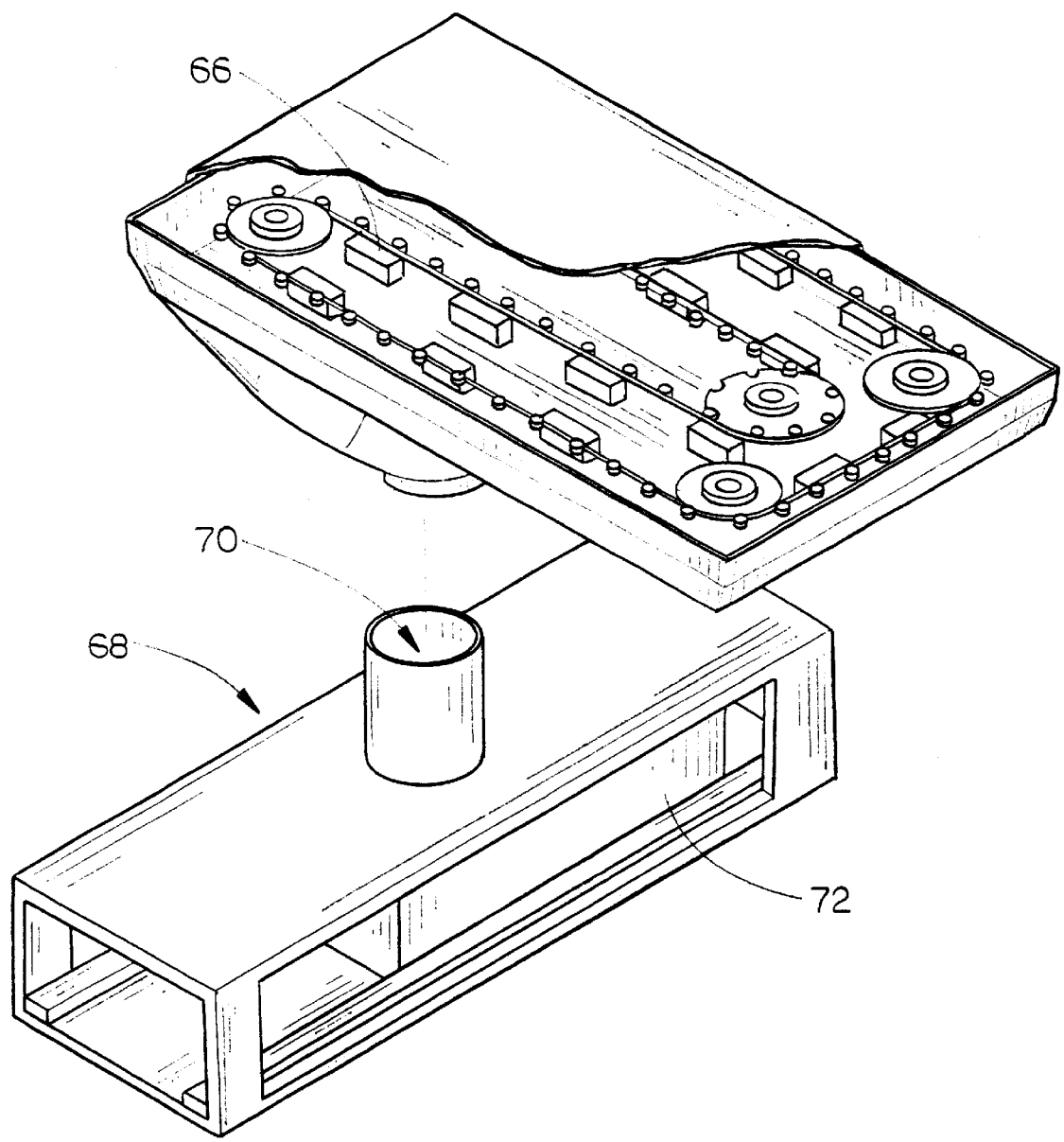
FIG. 8 is a partial perspective view of an embodiment of the seed carousel assembly of the seed metering system of the present invention.

A ground engagement assembly 14 is coupled to the lower portion of the frame 12 and is described generally herein as a component of the overall seed metering assembly but does not embody the inventive improvements of the present invention. As such, it is contemplated that the seed metering system 10 of the present invention could be assembled using nearly any prior art seeding machine having a mobile frame and a basic ground engagement assembly. For example purposes, the ground engagement assembly 14 depicted in FIG. 1 is provided with gauge wheels 16, which are coupled to the forward end portion of the frame 12. A plurality of furrow discs 18 are provided for the formation of a furrow in the ground, and a seed delivery tube 20 is positioned adjacent to the furrow disc 18 for depositing the seeds into the furrow. Firming wheels 22 adjacent the rearward portion of the frame 12 serve to close the furrow around the deposited seeds.

A plurality of seed metering devices or singulators 24 are positioned above the ground engagement assembly 14. The seed metering devices 24 may take a variety of different forms without departing from the principles of the present invention. Generally, the seed metering devices 24 are provided with an exterior cover 26 that will typically house a rotating wheel member having a plurality of fingers or open recesses formed at its peripheral edge. The seed metering devices 24 are provided with an opening 28 formed in the upper portion of the cover 26 to receive the seed. A discharge opening 30 is formed in the lower portion of the cover 26. As the seeds enter the upper opening 28, the wheel member engages the seeds and delivers them in an orderly manner to the discharge opening 30 at a selected rate. Accordingly, a volume of seed can be "metered out" to the ground engagement assembly at a particular rate desired for any particular planting operation.

The seed metering devices 24 typically operate by rotating their respective wheel members in a dispensing mode or clearing mode. In order to substantially prevent the necessity of stopping the seeding machine 10 after a particular variety of seed has been planted, the seed metering devices 24 of the present invention are alternately positioned to face in generally opposite directions. Motive power is directed to the seed metering devices 24 via a spline shaft 32 which is coupled to a main gear 34. A drive chain or belt 36 engages the main gear 34 and the drive gear 38, which is coupled to the wheel member housed within the seed metering device 24. A mating gear 40, positioned adjacent the drive gear 38, is provided to engage the drive gear 42 that is coupled to the wheel member housed within the adjacent seed metering device 24'. Accordingly, as the shaft 32 is rotated, the seed metering device 24 functions in a seed dispensing mode. Simultaneously, the wheel member within the seed metering device 24' is operated in a seed clearing mode. Although only two seed metering devices are depicted in the figures, a nearly unlimited number could be incorporated at once using the principles of the present invention.

The seed metering devices 24 and 24' are preferably secured to a sled 44 having first and second collar members 46 and 48, respectively. The first and second collar members 46 and 48 slidably engage shaft members 50 and 52, which are disposed within the first and second collar members 46 and 48. The shaft member 50 is preferably coupled to the rearward portion of the frame 12, while the shaft member 52 is preferably coupled to the forward end portion of the frame 12. In this arrangement, the sled 44 is selectively movable in a generally transverse direction with respect to the frame 12 and the ground engagement assembly 14. Accordingly, the sled 44 is preferably moved to position the seed metering device 24, which is operating in the dispensing mode, directly above or in engagement with the seed delivery tube 22. In this position, the seed metering device 24', which is operating in the clearing mode, should be positioned directly above or in engagement with a seed discard container 54 that prevents the unplanted seeds of one variety from being intermixed with the next variety of seeds to be planted. Once the seeds within the seed metering device 24 have been planted, the sled 44 can be moved transversely to position the seed metering device 24' directly above or in engagement with the seed delivery tube 20. In this position, the seed metering device 24 is preferably positioned directly above or in engagement with a second seed discard container 56. Once the seed metering devices are in position, the seed metering device 24 operates in a clearing mode while the seed metering device 24' operates in a dispensing mode. A power cylinder, such as hydraulic cylinder 58, is preferably coupled to the frame 12 and the sled 44 for automatic selective movement of the sled 44.

Each of the seed metering devices 24 and 24' is fed seed through supply tubes 60 and 60', respectively. Positioned above the supply tubes 60 and 60' is a seed container, which holds a volume of seed throughout the planting operation. The seed container could take one of many forms, such as a hopper 62, which may have one or more separate seed chambers therein, or a seed carousel 64. The seed carousel 64 is preferably provided with a plurality of seed cups 66 that are coupled to one another so that they travel a predetermined loop or path above the supply tubes 60 and 60'.

A gate assembly 68 is disposed between the seed tubes 60 and 60' and the hopper 62 or seed carousel 64. The gate assembly 68 is generally provided with an opening 70 formed in the upper end of the gate assembly 68 and is placed in open communication with the base of the hopper 62 or at least one position along the path traveled by the seed cups 66 of the seed carousel 64. A gate block 72 is positioned beneath the opening 70 and is selectively movable from side to side. The gate block 72 has a pair of mating tubes 74 and 74' extending therethrough. Accordingly, as the gate block 72 is moved from side to side, the opening 70 is selectively placed in open communication with one of the mating tubes 74 or 74'. The mating tubes 74 and 74' are positioned so that mating tube 74 is placed in open communication with the supply tube 60 when the mating tube 74 is selectively positioned in open communication with the opening 70. Similarly, as the gate block 72 is moved and the mating tube 74' is placed in open communication with the opening 70, it will also be positioned in open communication with supply tube 60'. A power cylinder, such as the hydraulic cylinder 76, is preferably coupled to the frame 12 and the gate block 72 to permit the automatic movement of the gate block with respect to the supply tubes 60 and 60'.

A GPS unit 78 can be integrated with the seed metering system 10 to accurately determine the location of the seed metering system 10 within the field. It is preferred that the GPS unit 78 be programmed to plot the location of the seeding machine 10 throughout the planting operation so that planting distances and directions can be easily calculated, either manually or by software incorporated within the GPS unit 78. The GPS unit 78 can also be coupled with the power cylinders 58 and 76 to provide for the accurate planting of the particular seed varieties. It is contemplated that the GPS unit could also be coupled with the steering system of the seed metering system 10 in order to accurately plant the plots in the correct length and position. To the extent that a GPS unit is not desired in the chosen application of the seed metering system 10, a cable trip mechanism could be used in its place.

In the drawings and in the specification, there have been set forth preferred embodiments of the invention; and although specific items are employed, these are used in a generic and descriptive sense only and not for purposes of limitation. Changes in the form and proportion of parts, as well as substitution of equivalents, are contemplated as circumstances may suggest or render expedient without departing from the spirit or scope of the invention as further defined in the following claims.

Thus it can be seen that the invention accomplishes at least all of its stated objectives.

We claim:

1. A device for planting a variety of seeds in the ground, comprising:
   a mobile frame having forward and rearward end portions;
   a seed container carried on said frame;
   a first seed metering device operatively coupled to said frame;
   a second seed metering device operatively coupled to said frame;
   at least one supply tube operatively connecting said seed container with said first and second seed metering devices; and
   ground engagement means operatively coupled to said frame adjacent said first and second seed metering devices for receiving seed from said first and second metering devices and depositing the seed within the ground;
   said first and second seed metering devices being operatively coupled to one another so that if one of said first and second seed metering devices is operated in a dispensing mode, the other of said first and second seed metering devices is simultaneously operated in a clearing mode.

2. The device of claim 1 wherein said first seed metering device is positioned in a generally forward facing direction and said second metering device is positioned in a generally rearward facing direction.

3. The device of claim 1 further comprising a sled member operatively slidably secured to said frame; said first and second seed metering devices being coupled with said sled member.

4. The device of claim 3 wherein said sled member is selectively movable along a generally transverse axis of said frame so that said first and second seed metering devices can be selectively positioned along said transverse axis.

5. The device of claim 4 further comprising a hydraulic actuator for selectively moving said sled member along said transverse axis.

6. The device of claim 1 having a first supply tube and a second supply tube; said first supply tube operatively connecting said seed container to said first seed metering device and second supply tube operatively connecting said seed container to said second seed metering device.

7. The device of claim 6 further comprising a gate member intermediate said seed container and said first and second supply tubes; said gate member being selectively movable to place said seed container in open communication with said first supply tube or said second supply tube.

8. The device of claim 7 further comprising a hydraulic actuator for selectively moving said gate member.

9. The device of claim 7 wherein said seed container is a hopper.

10. The device of claim 7 wherein said seed container is a seed carousel having a plurality of individual seed cups that are selectively movable along a pathway; said gate member having at least one opening positioned along said carousel pathway.

11. The device of claim 1 further comprising at least one seed discharge cup operatively coupled to said frame.

12. The device of claim 11 wherein said first and second seed metering devices are selectively movable along a generally transverse axis of said frame so that said first or second seed metering device is positioned in open communication with said at least one seed discharge cup when said first or second seed metering device is operated in said clearing mode.

13. The device of claim 1 further comprising GPS means for selectively determining the location of the device and tracking its movement.

14. The device of claim 13 wherein said GPS means is operatively coupled to said first and second seed metering devices to initiate and terminate the sliding movement of said first and second seed metering devices.

15. The device of claim 14 wherein said GPS means is operatively coupled to said first and second seed metering devices to initiate and terminate the planting and clearing modes of said first and second seed metering devices.

16. A device for planting a plurality of seed varieties within a field, comprising:
   a mobile frame;
   means coupled to said frame for carrying the plurality of seed varieties;
   a plurality of seed metering devices operatively coupled to said frame; said plurality of seed metering devices being operatively coupled to one another so that a select number of said plurality of seed metering devices operate in a dispensing mode while simultaneously a remaining number of said plurality of seed metering devices operate in a clearing mode;
   a plurality of supply tubes operatively connecting said means for carrying a plurality of seed varieties with the plurality of seed metering devices; and
   ground engagement means for receiving the plurality of seed varieties from said plurality of seed metering devices and planting the plurality of seed varieties within the ground.

17. The device of claim 16 further comprising a GPS assembly for tracking and at least partially controlling the device.

18. The device of claim 16 wherein said plurality of seed metering devices are coupled to a sled that is selectively movable on said frame to position said plurality of seed metering devices with respect to said ground engagement means.

19. The device of claim 18 further comprising a power cylinder operatively coupled to said sled for selectively moving said sled with respect to said frame.

20. The device of claim 16 further comprising a gate means for selectively distributing the seed varietals among the plurality of seed metering devices.

* * * * *